March 15, 1966  S. D. BRADLEY  3,240,648

METHOD OF AND APPARATUS FOR JOINING PLASTIC MATERIALS

Filed Aug. 20, 1962  2 Sheets-Sheet 1

INVENTOR.
STEPHEN D. BRADLEY
BY
WILSON, SETTLE & CRAIG
ATTORNEYS

United States Patent Office 3,240,648
Patented Mar. 15, 1966

3,240,648
METHOD OF AND APPARATUS FOR JOINING PLASTIC MATERIALS
Stephen D. Bradley, Grosse Pointe Farms, Mich., assignor to Macoid Industries, Inc., Detroit, Mich., a corporation of Michigan
Filed Aug. 20, 1962, Ser. No. 218,044
2 Claims. (Cl. 156—304)

This invention relates to a method of welding or joining thermoplastic articles, and more particularly to a method and apparatus for joining articles made of vinyl polymers and copolymers.

In the construction industry, particularly where concrete walls and the like are being poured and built, water-stops are utilized to prevent seepage of water downwardly through seams in such walls. Particularly in the construction of dams, large quantities of water-stops are used. These water-stops are supplied in standard length from a manufacturer, such as for example 10-20 feet long, and in walls longer than these standard lengths, the ends of the water-stops must be joined to provide units the lengths of the walls to effectively seal them against the downward passage of water therein.

Welding or joining has heretofore presented difficulties and no satisfactory technique has been developed for effecting precise joinder in the field. Excessive temperatures cause charring of the thermoplastic material and insufficient temperatures do not provide sufficient softening of the parts to effect joinder. Accordingly a step forward in the art of construction would be provided by an effective method and apparatus for joining elements of various kinds made from thermoplastic materials.

Accordingly it is an important object of the present invention to provide a method for joining thermoplastic articles.

A further object is to provide a method for joining thermoplostic articles made from vinyl polymers and copolymers.

Another object is to provide apparatus for welding thermoplastic materials such as articles made from vinyl polymers and copolymers.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Briefly, the present invention relates to a method and apparatus for welding or joining thermoplastic articles, such as articles made from vinyl polymers and copolymers, wherein the portions of such elements to be joined are placed in contacting relationship with a heating platen retained in a metal bath whose crystallization temperature range is precisely in the softening point range of the articles to be joined. According to the method of the present invention the portions of the articles to be joined are pressed into contact with the heating platen when the metal bath passes from the molten stage to the solid stage, that is at its crystallization temperature. Since the crystallization or solidification takes place at a very precise temperature, this being related to the softening temperature of the thermoplastic articles, exactly controlled softening of the thermoplastic articles for joinder is provided.

Thus a precise method for effecting field joinder, without the requirement of complex, precision controlled heating units, is provided.

Figure 1:
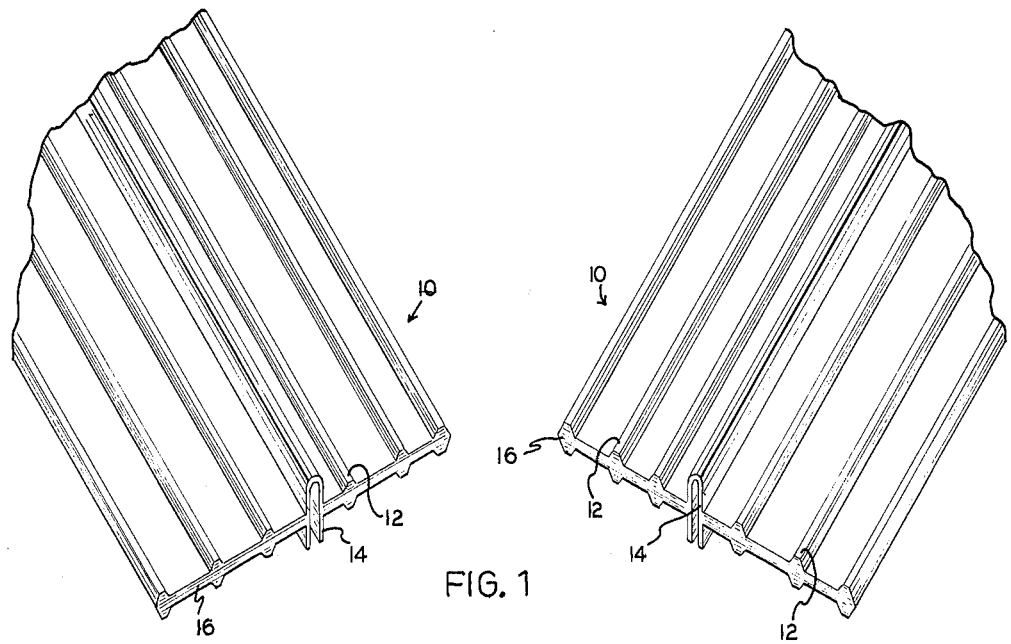
FIGURE 1 is a perspective view showing thermoplastic water stops with their ends squared for joinder in accordance with the present invention.

Now referring to the drawings, FIGURE 1 illustrates in perspective the ends of two sections of one form of water stop commonly used in the construction industry for sealing vertical joints of concrete walls, water retaining concrete dams, and similar structures. The water stops 10 comprise elongated ribbon-like structures having parallel ribs 12 formed longitudinally thereof, by which they are locked into the concrete. The units are suitably joined centrally by a U-shaped diaphragm 14.

As previously mentioned, the sections 10 come in standard lengths from a manufacturer. When a wall is being poured which is longer than such standard lengths, the ends of the lengths must be joined to provide a continuous water seal all along the wall. Accordingly, as shown in FIGURE 1, the ends are squared off as at 16 so that when they are softened, placed in abutting relationship and joined, a continuous and straight unit will be provided.

The water stops are suitably made from thermoplastic synthetic resins, such as vinyl polymers and copolymers. Particular polymeric compositions which are adapted to be joined by the present method have softening points in the range from about 350–400° F., depending upon plasticizer content. In order to effect perfect welding or joinder, they must be precisely softened and then placed in abutting relationship and sealed.

Figures 2, 3:
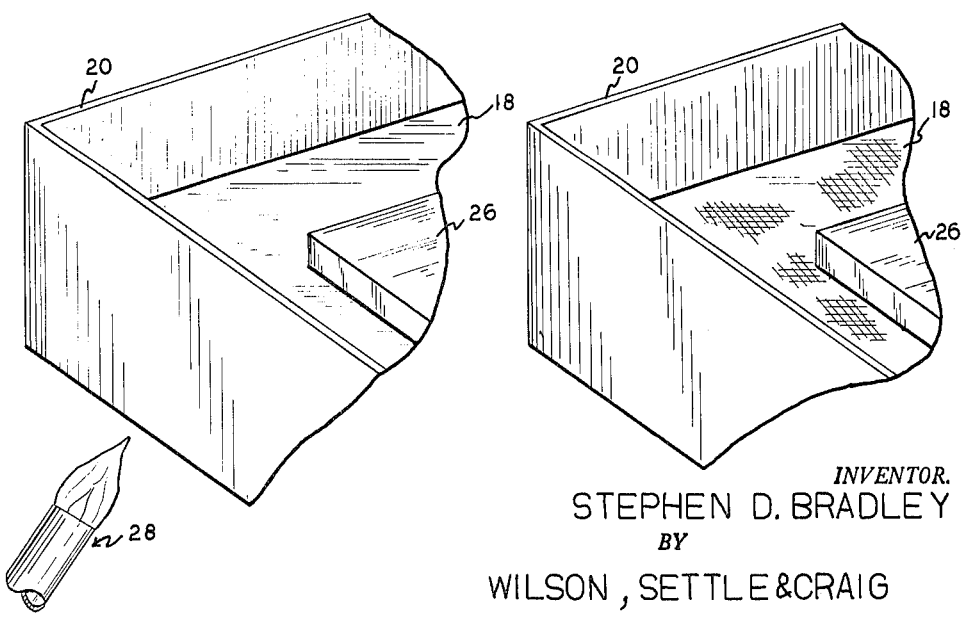
FIGURE 2 is a perspective view of a bath of metal, heated to molten condition, as utilized in the process of the present invention.
FIGURE 3 is a perspective view similar to FIGURE 2 but showing the bath of molten metal as it passes from the liquid stage to the early crystallization stage of solidification.
Figure 4:
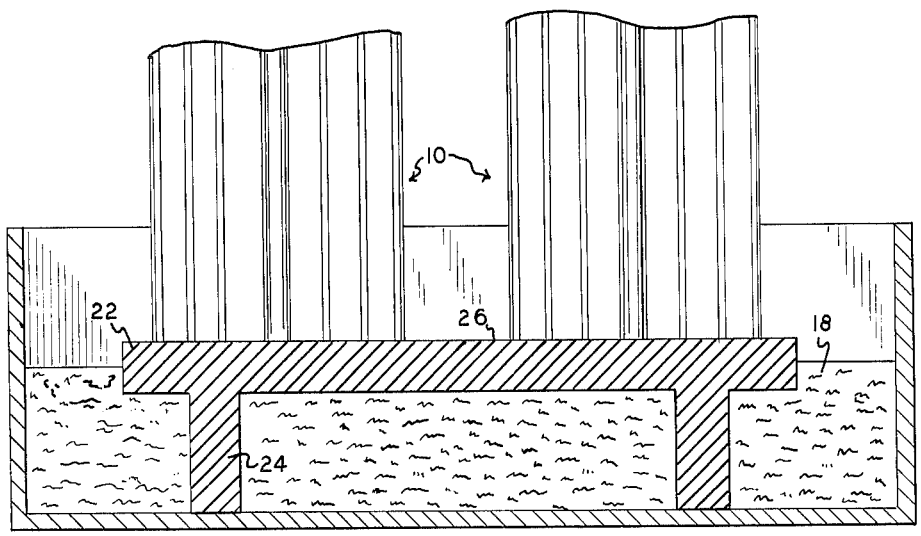
FIGURE 4 is a view showing the ends of the water stops of FIGURE 1 pressed into contact with a heating platen in the metal bath of FIGURE 3.

Accordingly, for purposes of effecting a joinder in accordance with the present invention, a metal bath, as illustrated in FIGURES 2, 3 and 4, is employed. As best shown in FIGURE 4, the metal bath 18 is retained in a suitable container 20, made of iron or steel or the like having a melting point higher than that of the metal alloy of the bath 18. Submerged in the metal bath 18, there is a heating platen 22, also made of iron or steel, thus having a melting point above that of the bath 18. The heating platen 22 is supported upon legs 24 and is thereby retained in a position where its upper surface 26 is above the top level of the metal bath 18.

As previously mentioned, the vinyl polymers and copolymers of which the water stops 10 are made, may have softening points in the range of about 350–400° F. According to the present invention, metal baths are employed which are made up of alloys having crystallization temperatures or solidification points within this temperature range. The following are typical of readily fusible alloys which can be employed.

| Melting Point, ° F. | Percent bismuth | Percent lead | Percent tin |
|---|---|---|---|
| 320 | 11.2 | 44.4 | 44.4 |
| 329 | 11.4 | 45.6 | 43 |
| 341.6 | 12.8 | 49 | 38.2 |
| 352.4 | 12.5 | 50 | 37.5 |
| 356.0 | 0 | 31 | [1] 69 |
| 392.0 | 0 | 20 | 80 |
| 446.0 | 0 | 55.6 | 44.4 |

[1] Tinman's solder.

It will accordingly be seen that an alloy tailored to the softening point of the particular vinyl polymer or copolymer can be provided.

*The procedural steps*

Figure 5:
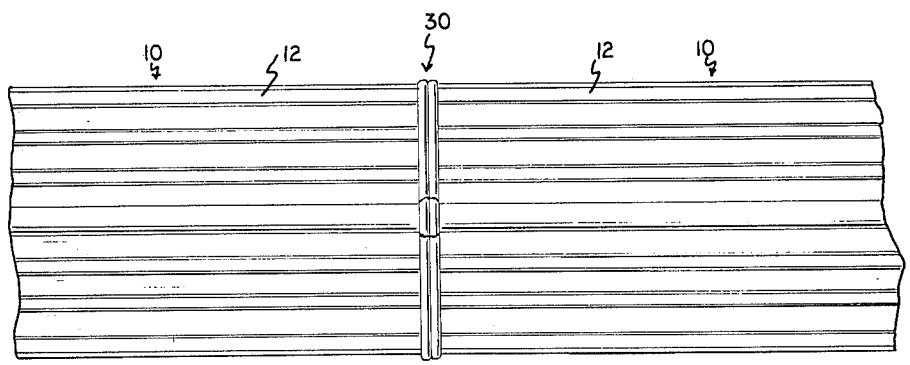
FIGURE 5 is a plan view showing the ends of the water stops of FIGURE 4 placed in abutting relationship to weld or join them together.

By reference to all of the figures of the drawings, it will be seen that the first step of the method includes the preparation of the articles to provide suitable surfaces to be joined. Thus as shown in FIGURE 1 the water stops 10 are squared off as at the ends 16. Thereafter, as shown in FIGURE 2 the metal bath 18 is heated by a torch 28 or equivalent heating means to render the metal molten. Thereafter the torch is removed and the metal bath is allowed to cool to its crystallization temperature as indicated by the check line condition of the top surface of the bath 18 of FIGURE 3. At this point, as shown in FIGURE 4, the squared off ends 16 are pressed against the upper surface 26 of the heating platen 22 to soften the ends for welding. Thereafter the softened ends are immediately removed and placed in abutting relationship as shown in FIGURE 5 and held in that position until the weld 30 has cooled and solidified to provide a permanent joinder of the parts 10.

*Advantages of the present invention*

It is an advantage of the present invention that a method and apparatus is provided for "fool-proof" welding or joinder of thermoplastic items in the field. By virtue of the fact that the crystallization temperature of the metal bath is employed as an exact temperature indicator, welding is accurately controlled thus assuring permanent and leak proof joints.

Further, it is an advantage of the method of the present invention that an operator, even though he is unskilled in the welding of thermoplastic articles, can provide consistently perfect welds by the simple expedient of observing a metal bath and applying the parts to be joined to a heating platen retained therein at the time the molten metal surrounding the heating platen turns from a liquid state to a solid state at its readily observable crystallization point.

A further important advantage of the present invention is the simplicity of the apparatus for fool proof field operation. Thus a metal bath contained within a steel container can be readily transported in its solid condition for use at different locations. Further, the metal bath is not subject to deterioration and accordingly has a long and useful life. Further, only a source of heat of uncontrolled nature is required for heating the metal bath to its liquid stage, it being a unique aspect of the present invention that the metal bath itself in going through its crystallization or solidification state provides an exact temperature and indication point by which parts to be welded can be softened. Thus no complex heat sensing or regulating devices are required to control the heat input to the bath to retain it at a proper temperature for welding. Thus in summary a simple and troublefree method and apparatus for effecting a field joinder of thermoplastic articles is provided in accordance with the present invention.

Although the method and apparatus of the present invention has been described with particular reference to the welding or joinder of thermoplastic articles made of vinyl polymers and copolymers having softening points in the range from about 350–400° F., it will be readily appreciated that other thermoplastic materials are operable and are to be included within the scope of the invention. Thus other thermoplastic resins would include the unfilled polyvinyl acetate having softening temperatures in the range from 120° F. to 390° F., polyvinyl acetate having softening temperatures in the range from 150° F. to 350° F., copolyvinyl chloride-acetate having softening temperatures in the range from 140° F. to 150° F., and vinylidene chloride having softening temperatures in the range from 240° F. to 280° F.

When using materials having softening points outside of the previously discussed temperature ranges, it is merely necessary to select a fusible alloy having an appropriate crystallization temperature corresponding to the softening temperature of the thermoplastic items to be joined. Thus fusible alloys of bismuth, lead, tin and cadmium having melting points in the range from as low as 120° F. to as high as 550° F. are adapted to use in accordance with the present method.

Having described my invention, I claim:

1. In a method of welding together parts made of vinyl polymers and copolymers having softening points in the range of about 350–400° F., the steps of providing a body of metal having a crystallization point in the range from about 350–400° F., heating the body of metal above its melting point to render it molten, cooling said molten body to its crystallization point, while observing the body to be partially molten and partially crystallized directly exposing the portions of the parts to be welded to the heat transfer influence of the metal body at its crystallization point to soften said parts, pressing said softened portions together in welding contact, and cooling said parts while in welding contact to complete the weld.

2. In apparatus for joining together parts made from thermoplastic materials having softening points in the range from 350–400° F., a fluid-retaining container made of steel, a heating platen positioned in said container for heating said parts of thermoplastic material, said heating platen having a horizontally disposed heating surface, a body of fusible alloy in said container in surrounding contacting relation to said platen, said alloy having a crystallization temperature in the range from 350–400° F., said container having an aperture for observation of the crystalline and molten state of said alloy, and means for heating said body of fusible alloy above its melting point whereby when said alloy cools to its crystallization point it is effective to heat said heating platen and the horizontally disposed surface thereof.

References Cited by the Examiner

UNITED STATES PATENTS

| 2,399,103 | 4/1946 | Clinedinst | 156—304 |
| 2,595,150 | 4/1952 | Lemeshka | 165—104 |
| 3,062,507 | 11/1962 | Andrus | 165—104 |
| 3,105,133 | 9/1963 | Norton | 165—104 |

EARL M. BERGERT, *Primary Examiner.*

HAROLD ANSHER, ALEXANDER WYMAN,
*Examiners.*